United States Patent [19]

Suzaki et al.

[11] 4,159,167
[45] Jun. 26, 1979

[54] SOUND MOTION PICTURE PROJECTION APPARATUS

[75] Inventors: Kuniyoshi Suzaki, Machida; Akira Ashida, Yokohama; Takashi Itani, Yokohama; Tateo Yamada, Yokohama; Masaya Maeda, Kawasaki; Kiyoshi Takahashi, Kunitachi; Hiroyuki Takimoto, Urawa, all of Japan

[73] Assignee: Canon Kabushiki Kaisha, Tokyo, Japan

[21] Appl. No.: 917,195

[22] Filed: Jun. 20, 1978

[30] Foreign Application Priority Data

Jun. 23, 1977 [JP] Japan ................................. 52-74845

[51] Int. Cl.² .......................... G03B 31/00; G03B 1/58
[52] U.S. Cl. ....................................... 352/14; 352/158
[58] Field of Search ................. 352/27, 157, 158, 159, 352/14

[56] References Cited
U.S. PATENT DOCUMENTS

| | | | |
|---|---|---|---|
| 3,597,056 | 8/1971 | Sasaki | 352/14 |
| 3,746,453 | 7/1973 | Kotler et al. | 352/14 |
| 3,825,327 | 7/1974 | Kosarko et al. | 352/14 |

Primary Examiner—Monroe H. Hayes
Attorney, Agent, or Firm—Toren, McGeady and Stanger

[57] ABSTRACT

Disclosed is a sound motion picture projection apparatus in which a head pad is urged by a spring member toward a film pressing position at which position the head pad presses a film against a magnetic head disposed along the sound recording and reproducing film path. The apparatus has a set mechanism of the self-holding type which sets the head pad against the urging force of the spring member to a film pressure releasing position at which position the head pad releases the pressing of the film, by the driving force of a driving motor and keeps the head pad to that position. The apparatus further has a film detecting member which is disposed in said sound film path after the magnetic head and operatively connected with the set mechanism in such a manner that the holding of the head pad at the film pressure releasing position by means of the set mechanism is released when the film detecting member detects the film introduced into the sound film path and thereafter the setting operation of the set mechanism is made ineffective as long as the film detecting member detects that a film exists in the sound film path. Thereby when the set mechanism is driven by the driving motor when no film exists at least in the sound film path, the head pad is automatically set to the film pressure releasing position and then the head pad is automatically changed from the film pressure releasing position to the film pressing position when the film detecting member detects the introduction of the film into the sound film path.

12 Claims, 18 Drawing Figures

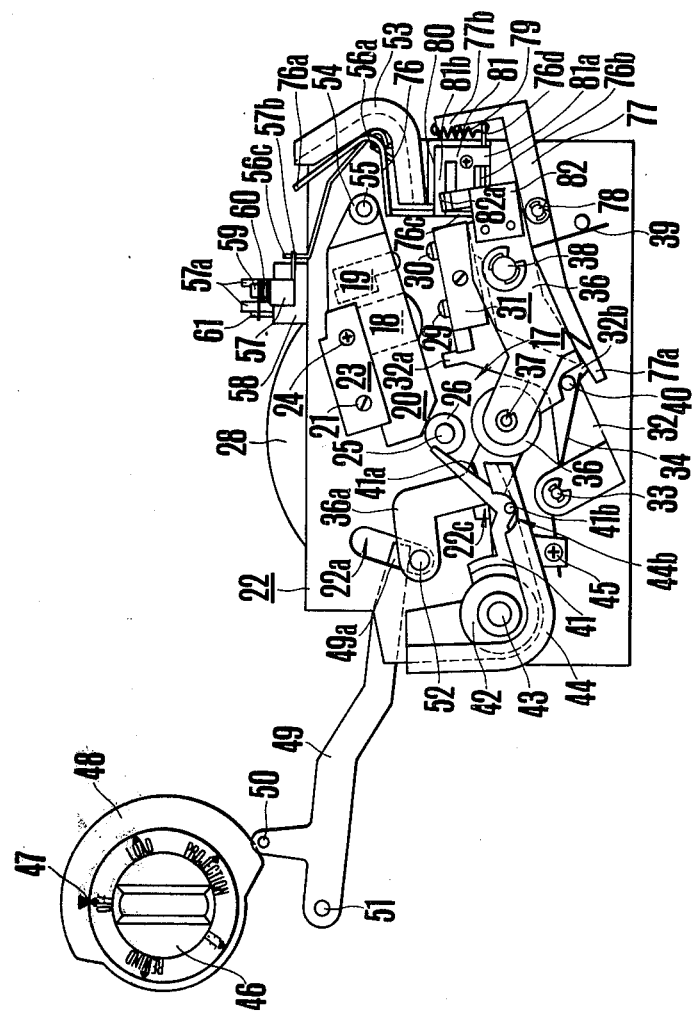

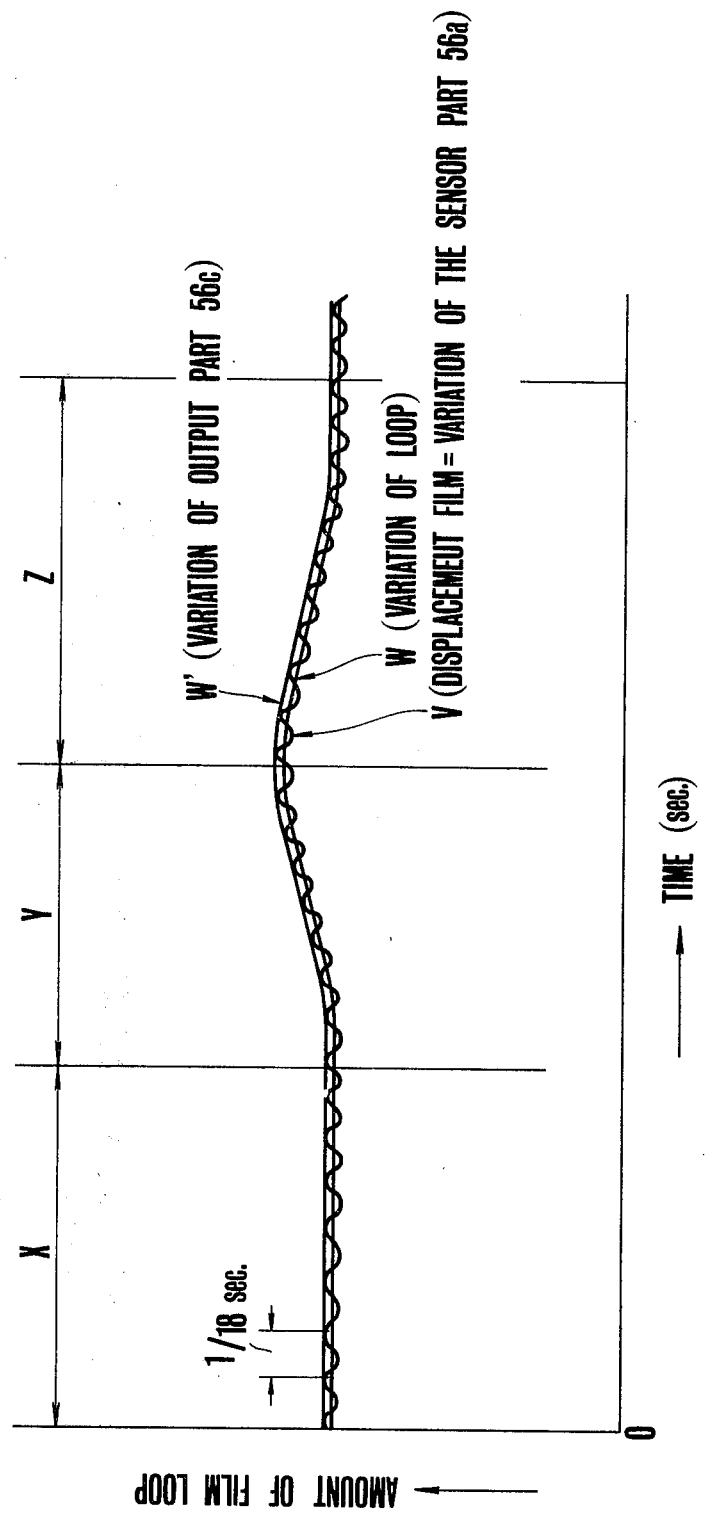

SOUND MOTION PICTURE PROJECTION APPARATUS

BACKGROUND OF THE INVENTION

1. Field of the Invention

The present invention relates to a sound motion picture projection apparatus, more particularly to a sound motion picture projection apparatus having a sound recording and reproducing film path, a sound recording and reproducing magnetic head disposed along said sound film path and a head pad movable between a film pressing position at which position the head pad presses a film against a magnetic head and a film pressure releasing position at which position the head pad releases the pressing of the film, and enabling reproduction and/or recording of sound information in synchronism with projection of picture images and further enabling automatic film loading from a picture projection station to the sound recording and reproducing film path.

2. Description of the Prior Art

Most of the conventional sound motion picture projection apparatus capable of automatic film loading is so designed that at the time of film loading, at first, an operation mode change-over dial is changed to a film loading position so as to actuate an intermittent film feed mechanism provided at the picture projection station as well as a continuous film feed means, such as sprocket driven by a motor, provided along the sound film path and at the termination of the film loading the operation mode change-over dial is further changed to a projection position so as to carry out the projection and the sound reproduction (and/or recording).

In the sound motion picture projection apparatus constructed as mentioned above, when the operation mode change-over dial is set to the film loading position, the head pad is kept away from the magnetic head to facilitate film loading and a capstan provided after the magnetic head and connected with a fly wheel for stabilizing the film speed and a pinch roller for pressing the film against the capstan are also kept apart from each other, while when the operation mode change-over dial is changed from the film loading position to the projection position, the magnetic head and the head pad as well as the capstan and the pinch roller are pressed against each other, holding the film therebetween so as to carry out the picture projection and the sound reproduction (and/or the sound recording). However, according to such a construction of the sound motion picture projection apparatus, it is necessary for the operator, at the time of projection start, to operate the operation mode change-over dial, after having confirmed that the film has been correctly loaded, and especially take care when the operation mode change-over dial is changed from the film loading position to the picture projection position. Namely, in case such a misoperation is carried out that the operation mode change-over dial is changed to the picture projection position while the leader part of the film has not yet reached the magnetic head in the sound film path or the sprocket for the continuous film feeding or that the film is loaded while the operation mode change-over dial has been changed to the picture projection position, there is a danger that the film transported from the picture projection station by means of the intermittent film feed mechanism, jams at the magnetic head and the head pad, because, at this time the magnetic head and the head pad have already been pressed against each other and thereby the film could not be loaded and moreover be damaged.

In consequence it is quite desirable to improve the sound motion picture projection apparatus of this kind in such a manner that despite the misoperation by the operator of the apparatus the film can be surely and correctly loaded automatically and the projection can always be carried out in a normal way.

SUMMARY OF THE INVENTION

A main object of the present invention is, in order to eliminate the above inconvenience, to offer a novel sound motion picture projection apparatus in which it is not necessary, at the time of projection start to confirm case by case whether the film is loaded correctly, and despite the abovementioned misoperation, the film can surely and correctly be loaded automatically and thereby the projection can always be carried out in a normal way.

Another object of the present invention, together with the above main object, is to offer a novel sound motion picture projection apparatus so designed that pressure pad means for pressing the film against magnetic head means disposed along the sound recording and producing film path is, at the start of the film loading, kept surely at the film pressure releasing position at which the pressure pad means releases the pressing of the film, and even if an eventual misoperation by the operator takes place, the pressure pad means can never be changed to the film pressing position at which the pressure pad means presses the film against the magnetic head means, while only when after the leader part of the film has passed the magnetic head means during the process of the film loading, the pressure pad means is automatically changed from the film pressure releasing position to the film pressing position, whereby the automatic film loading can be always achieved without any trouble.

Another object of the present invention is, together with the above objects, to offer a novel sound motion picture projection apparatus so designed that at the termination of the picture projection at which no film exists in the sound recording and reproducing film path any more, the pressure pad means is automatically changed from the film pressing position to the film pressure releasing position and kept there until a film is loaded newly, whereby the automatic film loading can always be carried out without any trouble.

For the above mentioned objects, according to the present invention, such a novel sound motion picture projection apparatus is proposed in which the pressure pad means is urged by a spring means toward the film pressing position, and on the other hand there are provided a set mechanism of self-holding type which sets the pressure pad means to the film pressure releasing position by the driving force of a driving motor and keeps the pressure pad means to the film pressure releasing position against the urging force of the spring means and a film detecting means disposed in the sound film path after the magnetic head means and operatively connected with the set mechanism in such a manner that the holding of the pressure pad means at the film pressure releasing position by means of the set mechanism is released when the film detecting means detects the film introduced into the sound film path and thereafter the setting operation of the set mechanism is made ineffective as long as the film detecting means detects that a film exists in the sound film path, and thereby when the set mechanism is driven by the driving motor in the state in which no film exists at least in the sound film path the pressure pad means is automatically set to the film pressure releasing position and then the pressure pad means is automatically changed from the film pressure releasing position to the film pressing position when the film detecting means detects the introduction of a film into the sound film path.

According to a preferable embodiment of the present invention, adding to the characteristic construction of the above mentioned sound picture projection apparatus, a further improved construction is proposed in which a capstan driven by the driving motor for continuous film feeding is disposed between the magnetic head means and the film detecting means along the sound film path and the combination of the capstan and a pinch roller for pressing the film against the capstan, the film is continuously transported through the sound film path, while a cam means for actuating said set mechanism is connected to the capstan.

Further in this embodiment, as the self-holding type set mechanism a link construction consisting of a first lever, having one end connected to a pad support means supporting the pressure pad means linked with a second lever, having one end connected with the film detecting means, is adopted, in which an engaging part with which an operation means to be actuated by said cam means is engageable is provided on a part of the second lever, whereby said pressure pad means is set to the film pressure releasing position through the first lever when the second lever is driven by the operation means through the engaging part while the operation means follows the cam means.

Another object of the present invention is to offer a novel construction of the sound motion picture projection apparatus, particularly the projection apparatus having a loop sensor between the picture projection station and the sound recording and reproducing station for detecting the variation in a film loop to be formed between said both stations, in which despite the existence of the loop sensor, the automatic film loading from the picture projection station to the sound recording and reproducing station can be easily carried out.

Particularly for this object according to the present invention, such a novel construction of the sound motion picture projection apparatus is also proposed in which at the inside of a fixed film guide means for guiding the film from the picture projection station to the sound recording and reproducing station, a loop sensor means for detecting the variation in the film loop is arranged so as to contact with the film at the inside of the film loop formed between the picture projection station and the sound recording and reproducing station and further a film regulate means movable between an operable position at which the film regulate means is entered between the loop sensor means and the film guide means and a non-operable position at which the film regulating means is withdrawn out of the space between the loop sensor means and the film guide means is provided, and thereby by setting the film regulating means to the operative position at the time of film loading, the film transported from the picture projection station is guided toward the sound recording and reproducing station by the cooperation of the film regulating means with the film guide means, being isolated from the loop sensor means, while by changing the film regulating means from the operable position to the non-operable position at the termination of film loading, the film regulation is released and at the same time the loop sensor means is set to the operative state.

In this case, according to the embodiment such a construction is also proposed in which a change-over mechanism for changing the film regulating means between said two positions is operatively associated with the pressure pad means and the pinch roller in such a manner that when the pinch roller is changed from the film pressure releasing position to the film pressing position for the film loading while the pressure pad means is retained at the film pressure releasing position, the film regulating means is changed from the non-operative position to the operative position, and thereafter when the pressure pad means is changed from the film pressure releasing position to the film pressing position at the termination of film loading, the film regulating means is changed from the operative position to the non-operable position.

Further, in this case, according to the embodiment, such a construction of the film loop sensor means is also proposed in which the loop sensor means has a sensor part bent so as to contact with the film plane, a coil part connected with the sensor part and being made use of as a linked part for swinging the whole structure and an output part extending from the coil part so as to mechanically produce the variation of the amount of the film loop, and is made of a piece of elastic wire material with a very small weight, which is very profitable as a film loop sensor for the sound motion picture projection apparatus of this kind because the sensitivity for the variation in the amount of the film loop is remarkably superior, while the apparatus never picks up the pulsation of the film owing to the intermittent transportation by means of the film pull-down claw, and it can be constructed very simply with a small number of parts and the adjustment is very easy and which is remarkably economical.

Further other objects and features of the present invention will be clarified from the explanations to be made below in accordance with the accompanying drawings.

BRIEF DESCRIPTION OF THE DRAWINGS

In the accompanying drawings:

FIGS. 3 to 7 show the set states of the important parts of the projection apparatus in each mode, wherein FIG. 3A, 3B and 3C show the apparatus in the stopped and/or reset modes, respectively seen from front and behind, FIGS. 4 and 5 show the state at the time of film loading with the lapse of time, respectively seen from front and behind, FIG. 6 shows the state at the time of projection, seen from front

FIG. 8 shows in detail the composition of the film detecting member for the automatic setting of the sound recording and reproducing system and of the fixed film guide frame, wherein

FIG. 9 shows the detailed perspective view of the film loop sensor built into the projection apparatus and of the movable film regulating member, wherein

FIG. 10 is a diagram showing the displacement of the film in the loop, the variation in the loop amount and the response of the film loop sensor.

DETAILED DESCRIPTION OF THE PREFERRED EMBODIMENT

Figure 1:
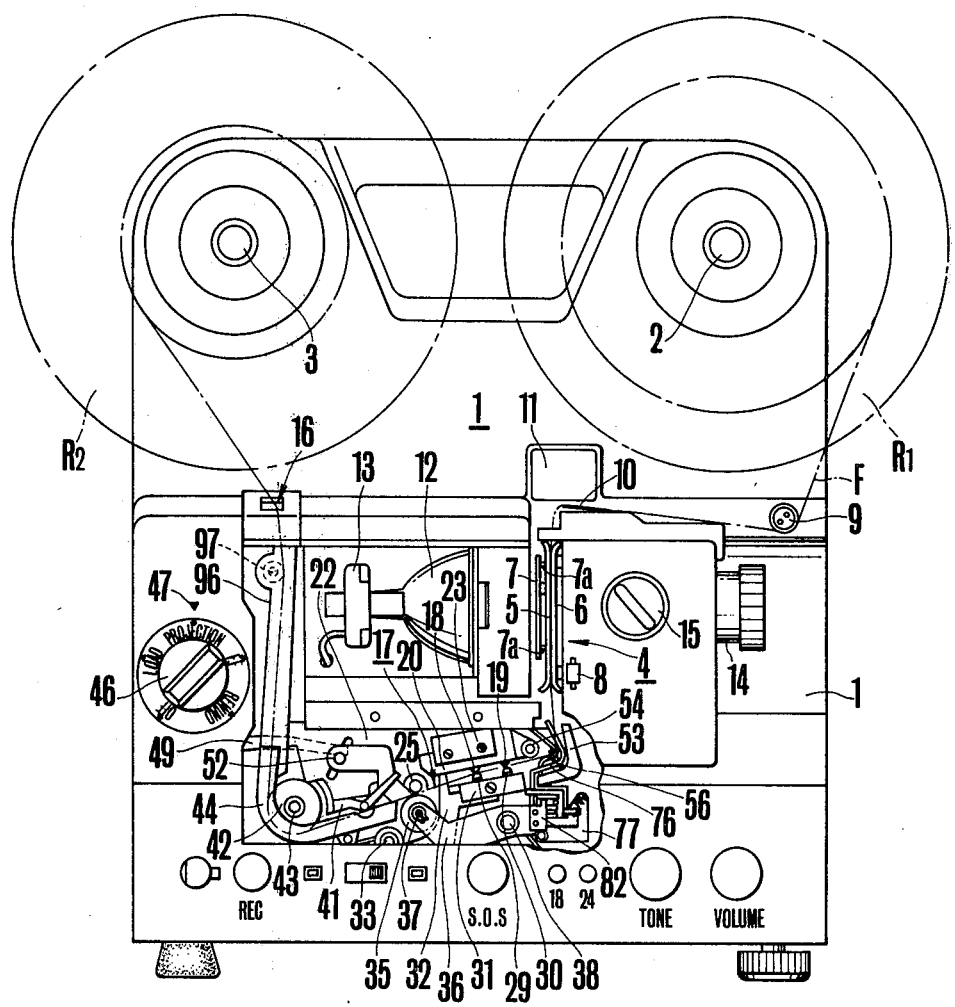
FIG. 1 shows an embodiment of the sound motion picture projection apparatus according to the present invention, and particularly shows the important parts related to the present invention, in which the projection apparatus is set to the projection state.

In FIG. 1, the sound motion picture projection apparatus is denoted by 1. 2 is a spindle for a film supply reel and 3 is a spindle for a film winding up reel, wherein the film supply reel R1 and the film winding up reel R2 are respectively mounted on these spindles 2 and 3. 4 shows an image projecting station of the projection apparatus 1, at which a fixed aperture plate 5, a releasable film pressure plate 6 for pressing the film F against the aperture plate 5 by the urging force of a spring, not shown, and a film intermittent feeding member 7 having film feeding claws 7a and adjustable up and down for frame adjusting by an external operation knob 8, are provided.

9 is a film guide roller, 10 is a film damper for absorbing the intermittent shocks given to the film by the intermittent feed member 7, 11 is a pilot lamp window, 12 is a projection lamp, 13 is a lamp socket, 14 is a projection lens, 15 is an external operation dial for focus adjustment of the projection lens 14 and 16 is a film feed out opening.

17 shows a sound recording and reproducing film path of the projection apparatus 1, along which a sound recording and reproducing magnetic head 18 and a capstan 25 for film continuous feeding are arranged in sequence. As is shown in detail in FIGS. 2 and 3A, the sound recording and reproducing magnetic head 18 is supported together with an erasing head 19 by a head holding frame 20. The head holding frame 20 is rotatably supported by a shaft 21 between a fixed base plate 22 and a frame plate 23 mounted on the base plate 22 and fixed by a screw 24 in the state that the heads 18 and 19 are properly adjusted and opposed close to the sound film path 17. While the capstan 25 is arranged close to the sound film path 17 as a rotation shaft of a fly wheel 28 rotatably supported by means of a bearing member 26 mounted on the base plate 22 and the not shown bearing member mounted on the base plate 27.

29 and 30 are head pads for pressing the film F respectively against the sound recording and reproducing head 18 and the erasing head 19. As is shown in detail in FIGS. 2 and 3A, these head pads 29 and 30 are supported together with press springs 101 and 102 (FIG. 6) by a pad holding member 31, which is adjustably mounted at the end of a support lever 32. The support lever 32 is rotatably supported by means of a shaft 33 on the base plate 22 so as to change the head pads 29 and 30 between an operative position (at which the head pads 29 and 30 press the film F against the magnetic heads 18 and 19 respectively shown in FIGS. 1, 5, 6 and 7A) and an inoperative position (at which the head pads 29 and 30 release the pressing of the film F respectively shown in FIGS. 2, 3A, 3C, 4 and 7B) and is urged by a spring 34 through a pin 40 around the shaft 33 to the counter-clockwise direction in FIGS. 1, 2, 3A, 4 and 6, namely in the direction to which the head pads 29 and 30 are changed to the operative position. Now, the counter-clockwise rotation of the pad support lever 32 will be restricted by the impingement of a stopper projection 32a against the lower surface of the head holding frame 20, and the head pads 29 and 30 are pressed against the heads 18 and 19 by the urging force of the springs 101 and 102 at the state that the stopper projection 32a impinges against the lower surface of the head holding frame 20 (FIG. 6).

35 is a pinch roller for pressing the film F against the capstan 25 for continuous film feeding at the time of film loading and sound recording and reproduction. As is shown in detail in FIGS. 2 and 3A, the pinch roller 35 is rotatably supported by a shaft 37 secured on a pinch roller support frame 36, which is rotatably supported by a shaft 38 on the base plate 22 so as to change the pinch roller 35 between an operative position (at which the pinch roller 35 presses the film F against the capstan 25 at a certain determined angle shown in FIGS. 1, 2, 4 and 6) and an inoperative position (at which the pinch roller 35 releases the pressing of the film F shown in FIG. 3A), and is urged by a spring 39 around the shaft 38 in the clockwise direction in FIGS. 1, 2, 3A, 4 and 6, namely in the direction to which the pinch roller 35 is changed to the operative position.

The pad support lever 32 is operatively associated with the pinch roller support frame 36 through the pin 40 so that the head pads 29 and 30 are changed from the operative position to inoperative position when the pinch roller 35 is changed from the operative position to the inoperative position.

41 is a film detecting member provided after the capstan 25 in the sound film path 17 and releasing the holding of the pad support lever 32 at the film pressure releasing position by a set mechanism to be explained later, by detecting the film F fed by the capstan 25 and the pinch roller 35. The film detecting member 41 has an inclined plane 41a on which the front end of the film F fed by the capstan 25 and the pinch roller 35 may impinge at the time of film loading and arched parts 41b which contact with the both side edge portions to the exclusion of effective picture area of the film at the time of projection, film fast forwarding and film rewinding, and is rotatably supported by a shaft 43 on the base plate 22, together with a film guide roller 42.

The construction of the film detecting member 41 is shown in detail in FIG. 8. Namely, as is shown especially in FIG. 8B, the part before the arched parts 41b is made sufficiently narrower than the width of the film F while the inclined plane 41a is provided in this narrower part.

44 is a film guide frame secured on the plate 22 by a screw 45 and having, as is shown in detail in FIG. 8, a film guide plane 44a, a concave part 44b in which the foot part including the arched parts 41b of the film detecting member 41 enters and a tapered narrow groove part 44c continued to the concave part 44b and being narrower than the width of the film F but a little wider than the width of the inclined plane 41a of the film detecting member, for receiving the base part of the inclined plane 41a of the film detecting member 41.

In consequence, the film detecting member 41 is generally in the state that the foot part including the arched parts 41b has entered into the concave part 44b of the film guide frame 44 by its own weight (FIG. 8A), while at the time of film loading, as the front end of the film F fed by the capstan 25 and the pinch roller 35 impinges against the inclined part 41a and is guided along the inclined plane 41a and then impinges against the top of the key shaped part formed by the inclined plane 41a of the film detecting member and the film guide plane 44a of the film guide frame 44 (FIGS. 8B, and 8C), the front end of the film F is jammed at the top of this key shaped part, so that the film detecting member 41 is rotated in the counterclockwise direction around the shaft 43 by the force of the film F produced with the film feeding by the capstan 25 and the pinch roller 35, whereby the holding of the pad support lever 32 at the film pressure releasing position by the set mechanism to be explained later is released.

46 is an operation dial for mode change over of the projection apparatus 1, provided with indications "OFF", "LOAD" (film loading), "PROJECTION" (film projection), "F.F" (film fast forwarding) and "REWIND" (film rewinding) with respect to a fixed index 47 and a cam 48 for controlling the change over of the set position of the pinch roller 35 in accordance with the mode change over.

As is shown in detail in FIG. 3A, the cam 48 is mounted on a same shaft 46a as that of the dial 46 and formed in such a manner that when the operation dial 46 is set at "LOAD" or "PROJECTION" with respect to the fixed index 47, the pinch roller 35 is set to the operative position (FIGS. 4 and 6), while when the operation dial 46 is set at "F.F", "REWIND" or "OFF" the pinch roller 35 is set to the inoperative position (FIG. 3A).

49 is a change-over lever having a cam follower pin 50 for the cam 48 and rotatably supported by a fixed shaft 51. As is shown in FIG. 3A, the top end 49a of the lever 49 is in contact with a pin 52 provided on a projection arm 36a of the pinch roller support frame 36 and extends through an opening 22a of the base plate 22. When the operation dial 46 is set at "OFF", "F.F" or "REWIND", the change-over lever 49 is rotated around the shaft 51 in the clockwise direction in FIGS. 3A, 4 and 6 by the cam 48, and thereby rotates the support frame 36 around the shaft 38 in the counterclockwise direction against the urging force of the spring 39 through the pin 52 by the top end 49a thereof, so that the pinch roller 35 is set to the inoperative position (FIG. 3A), while when the operation dial 46 is set at "LOAD" or "PROJECTION", the cam 48 is released from the cam follower pin 50 thereby the change-over lever 49 becomes rotatable in the counterclockwise direction, so that the pinch roller support frame 35, rotating the change-over lever 49 around the shaft 51 in the counterclockwise direction, rotates itself around the shaft 38 in the clockwise direction, so as to set the pinch roller 35 to the operative position (FIGS. 4 and 6). 53 is a film guide frame secured on the base plate 22 before the sound film path 17 so as to guide the film F fed from the image projecting station 4 by the intermittent film feed member 7 to the sound film path 17.

Figure 2:
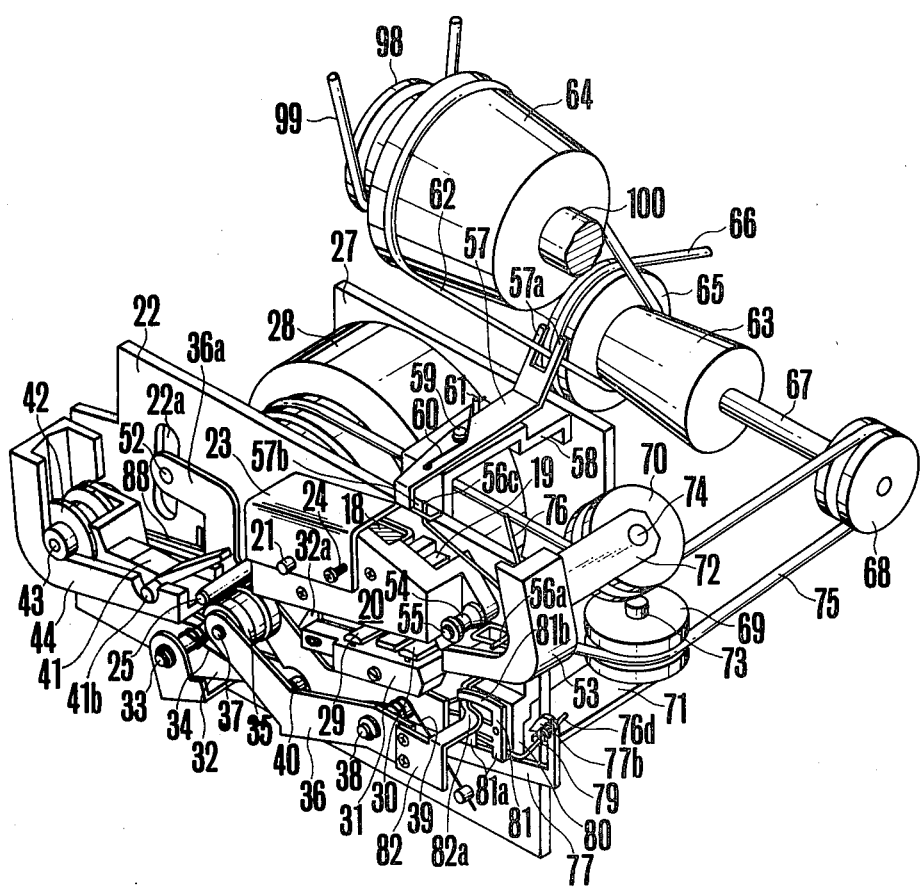
FIG. 2 shows the sound recording and reproducing system of said projection apparatus in perspective view, in which the projection apparatus is set to the film loading state.

54 is a film guide roller disposed before the magnetic heads 18 and 19 so as to control the running path of the film F in such a manner that the film F does not come into contact with the magnetic heads 18 and 19 especially at the time of film fast forwarding and film rewinding. The guide roller 54 is rotatably supported on a shaft 55 provided on a part of the head holding frame 20 (FIG. 2).

56 is a loop sensor provided immediately after the image projection station 4 so as to detect the variation in the film loop formed between the image projection station 4 and the sound film path 17. As is shown in detail in FIGS. 9A, 9B and 9C, the loop sensor 56 has a sensor part 56a positioned in the neighborhood of the R part of the film guide frame 53 and bent so as to be in contact with the film plane at the inside of the film loop formed in the guide frame 53, a coil part 56b that is a continuation of the sensor part 56a and is adapted for swinging the whole sensor and an output part 56c extending from the coil part 56b for mechanically outputting the information of the variation in the film loop amount. The loop sensor 56 is made of a remarkably light weight metal, a magnetic spring wire, for example of stainless steel wire, and is rotatably supported by the shaft 38 of the pinch roller support frame 36 at the coil part 56b.

57 is a projection speed control member responsive to the loop sensor 56 so as to control the projection speed (the film feeding speed by the intermittent film feed member 7) in order to keep the film loop in a certain determined amount. The control member 57 has a forked part 57a, for holding a belt 62 spanning a pair of conical pulleys 63 and 64 constituting a stepless speed changing mechanism of the projection system (the intermittent film feed device) and is rotatably supported by a shaft 59 on a bridge plate 58 provided between the base plates 22 and 27, and further is connected with the output part 56c of the loop sensor 56 at the tail part 57b so as to adjust the projection speed by changing the contact position of the belt 62 on the conical pulleys 63 and 64 in response to the loop sensor 56, so that the film loop is maintained within tolerance.

60 is a spring for urging the speed control member 57 in a certain determined direction, the urging force thereof being determined so as to be in balance with the elastic force of the loop sensor 56 and thereby assuring the balance between the loop sensor 56 and the control member 57. 61 is a stopper pin for the speed control member 57, which is provided on the bridge plate 58.

In FIG. 2, 65 is a cylindrical pulley united with the conical pulley 63, which is connected through a belt 66 with a pulley connected with an output shaft of a motor, not shown in the drawing. Further, 68 is a fly wheel driving pulley mounted on a shaft 67 of the pulleys 63 and 65, while 69 and 70 are idler pulleys each rotatably supported on shafts 73 and 74 provided on arm plates 71 and 72 mounted on the base plate 22. The fly wheel 28 is driven by the pulley 68 through a belt 75 spanning the fly wheel 28 and the pulley 68 through these idler pulleys 69 and 70. Further, although it is not shown in the drawing, a conventional cam mechanism for driving the intermittent film feed member 7 and the shutter blade are connected with a shaft 100 of the conical pulley 64. 98 is a reel spindle driving-cylindrical pulley mounted on the shaft 100 of the conical pulley 64, which is connected with the reel spindles 2 and 3 through a belt 99 and clutch mechanisms not shown in the drawing.

76 is a movable film regulating member for guiding the film F fed from the image projection station 4 to the sound film path 17 in cooperation with the fixed film guide frame 53 in such a manner that the film F is isolated from the sensor part 56a of the loop sensor 56. As is shown in detail in FIGS. 9A, 9B and 9C, the regulating member 76 has a film regulating part 76a having a shape corresponding to that of the guide frame 53, and as is shown in FIGS. 2 and 3A, is supported at a bent part 76b so as to be rotated around the line X—X in FIGS. 9A, 9B and 9C, by a block 80 secured on the base plate 22 and a first press piece 81a of an elastic press plate 81 mounted on the block 80 by the regulating member 76 is controlled by the cooperation of a lever 77 operatively associated with the pad support lever 32 and a change over member 82 attached to the pinch roller support frame 36, in such a manner that the film regulating part 76a is inserted between the fixed film guide frame 53 and the sensor part 56a of the loop sensor 56 only at the time of film loading, namely only when the pinch roller 35 is changed to the operative position (FIGS. 2 and 4) in the state in which the head pads 29 and 30 have been set to the inoperative position, so as to guide the film in cooperation with the guide frame 53. Namely, the lever 77 is rotatably supported by a shaft 78 provided on the base plate 22 and impinges against the projection 32b formed on a part of the pad support lever 32 with the end 77a thereof and at the same time is connected to the tail part 76b of the film regulating member 76 through a spring 79 with the shoulder part 77b thereof. On the other hand, the change-over member 82 has an operative part 82a for pressing the rising up part 76c of the regulating member 76 through a second press piece 81b of the plate 81, which is in contact with the rising up part 76c of the control member 76, and is secured at the tail part of the pinch roller support frame 36 so that in the state in which the pinch roller 35 has been set at the inoperative position the rising up part 76c is pressed while the part 76c is released when the pinch roller 35 is changed to the operative state. In consequence, only when the pressure on the rising up part 76c by the operative part 82a of the change-over member 82 is released (namely, the pinch roller 35 is changed to the operative position) in the state in which the spring 79 is tensioned by the rotation of the lever 77 in the counterclockwise direction around the shaft 78 (namely, in the state in which the head pads have been set to inoperative state), the film regulating member 76 is changed from the position shown by a dash-dotted line in FIG. 9B (the inoperative position at which the film regulating part 76a has been withdrawn from the space between the sensor part 56a of the loop sensor 56 and the film guide frame 53) to the position shown by a solid lines in FIG. 9B (the operative position at which the film regulating part 76a has entered between the sensor part 56a of the loop sensor 56 and the film guide frame 53) by the urging force of the spring 79 while held in the inoperative position shown by the dash dotted lines in FIG. 9B when the head pads 29 and 30 have been changed to the operative position or when the pinch roller 35 has been set to the inoperative position.

Figure 9A:
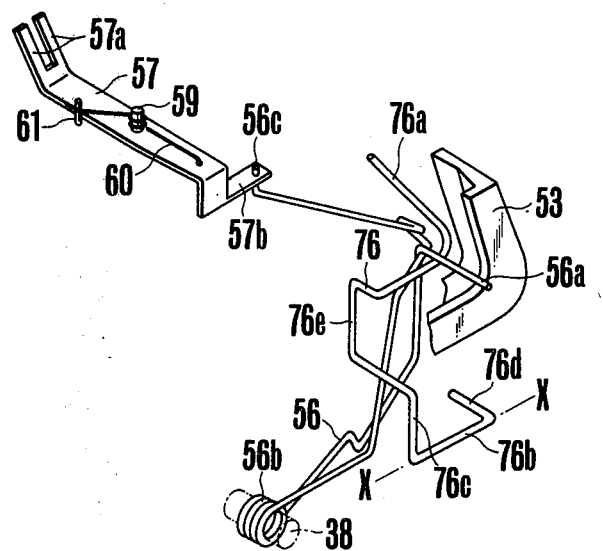
FIG. 9A shows the state before the film has been loaded.
Figure 9B:
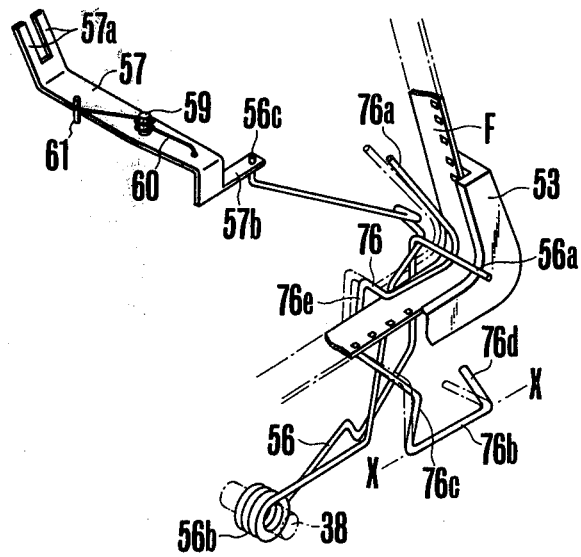
FIG. 9B shows the state at the time of film loading and FIG. 9C shows the state after the film has been loaded.

Further, the connecting part 76e between the film regulating part 76a and the rising up part 76c is largely bent aside so as not to be brought in contact with the film running between the regulating part 76a and the film guide frame 53 even if the film regulating part 76a is in the operative position, namely at the set position shown in FIG. 9B.

Below, the composition of the set mechanism for setting the head pads 29 and 30 to the inoperative position will be explained, particularly in accordance with FIGS. 3B and 3C.

In the drawing, 83 is a first lever which is connected, by a pin-slot connection, at the slot 83a thereof, with a pin 84 on a part of the pad support lever 32 and penetrating the hole 22b in the base plate 22. 85 is a spring spanning the pin 84 and a pin 86 provided on the first lever 82.

87 is a second lever which is rotatably supported by a pin 89 provided on a part of a lever 88 united with the film detecting member 41 and penetrating the hole 22c of the base plate 22, and is linked with the first lever 83 by a shaft 90.

91 is a kick lever controlled by a cam 94 rotating together with the capstan 25. The kick lever 91 has an operative part 91a to be engaged with an engaging part 87a of the second lever 87 under the control the cam 94 so as to bring the first and second levers 83 and 87 back into the state shown in FIG. 3B when the first and second levers 83 and 87 are in the state shown in FIG. 7A, and is rotatably mounted on a shaft 92 provided on the base plate 22 and is urged around the shaft 92 by a spring 93 in the counterclockwise direction in FIG. 3B, namely in such a manner that the movement following the cam 94 is maintained. Further, 95 is a stopper for the first lever 83, which is secured on the base plate 22.

Further in FIG. 1, 96 is a film duct for guiding the film F from the film guide frame 44 toward the film feed out opening 16.

97 is a film guide roller rotatably mounted at a proper position in the film duct 96.

Below, the operation of the sound motion picture projection apparatus having such composition as mentioned above in each mode will be explained.

At first, in the state in which the operation dial 46 for changing the mode has been set at "OFF", the pinch roller support frame 36 has been, as is shown in FIG. 3A, rotated around the shaft 38 by the change-over lever 49 through the pin 52 against the spring 38 in the counterclockwise direction in the drawing because the change-over lever 49 has been rotated around the shaft 51 by the cam 48 of the operation dial 46 the clockwise direction, so that the pinch roller 35 is set at the inoperative position, distant from the capstan 25.

Figure 3B:
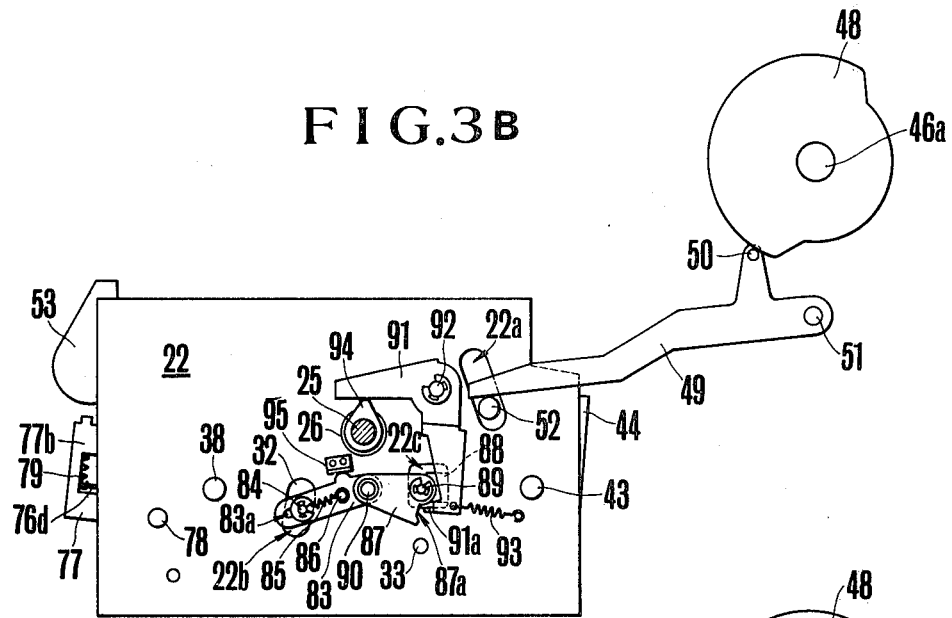
Figure 3C:
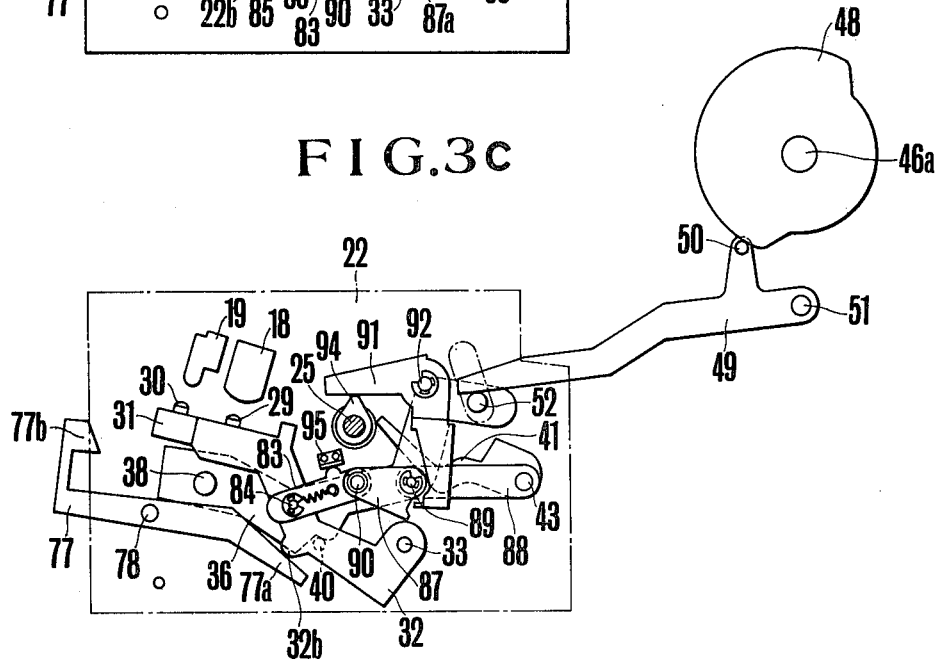

Further, at this time the pad support lever 32 is kept, by means of the levers 83 and 87, at the position at which the lever 32 has been rotated around the shaft 33 by means of the spring 34 in the clockwise direction in FIG. 3A against the urging force of the spring 34, because, as is shown in FIGS. 3B and 3C, the first and second levers 83 and 87 consisting of the set mechanism for the support lever 32 remain in the state bent in the shape of angle "∧" at the link connection shaft 90 between the both support points 84 and 89 until the first lever 83 impinges against the stopper 95 by the urging force of the spring 34 working upon the pad support lever 32, so that the head pads 29 and 30 are respectively set at the inoperative positions distant from the magnetic heads 18 and 19 (FIGS. 3A and 3C).

Further, in the above state, the movable film regulating member 76 is set at the inoperative position shown in FIG. 9A against the urging force of the spring 79, because due to the displacement of the pinch roller support frame 36 into the position shown in FIG. 3A, the rising up part 76c is pressed through the second press piece 81b of the press plate 81 by means of the operative part 82a of the change-over member 82 provided at the tail part of the support frame 36 although the lever 77 has, as is shown in FIG. 3A, been rotated around the shaft 78 by means of the projection 32a of the pad support lever 32 in the counterclockwise direction in the drawing.

Figure 8A:
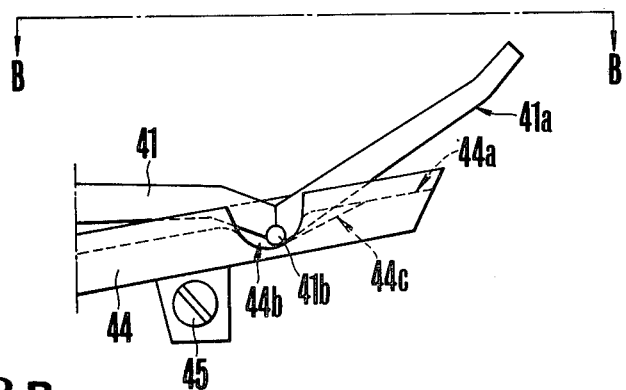
FIG. 8A shows the side view for showing the relation between the detecting member and the film guide frame before the film detecting member has detected the film.
Figure 8B:
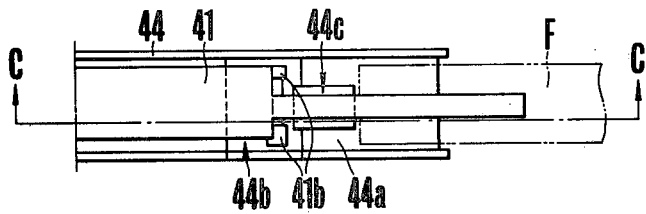
FIG. 8B shows the view seen along the line B—B in FIG. 8A.
Figure 8C:
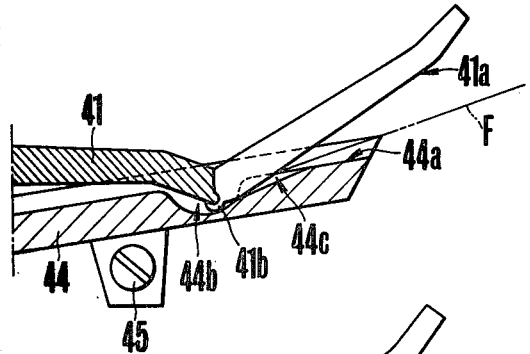
FIG. 8C shows the sectional view seen along the line C—C in FIG. 8B.
Figure 8D:
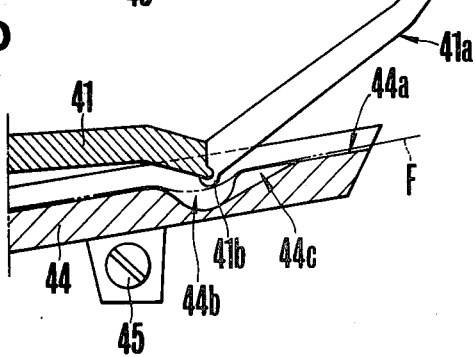
FIG. 8D shows the relation between the detecting member and the film guide frame in the state in which the film exists in the film guide frame, shown in the same sectional view as in FIG. 8C.

Further, at this time, the film detecting member 41 has entered into the concave part 44a of the fixed film guide frame 44 due to its own weight, as is shown in FIG. 8A. These state is shown in FIGS. 3A to 3C.

Figure 4:
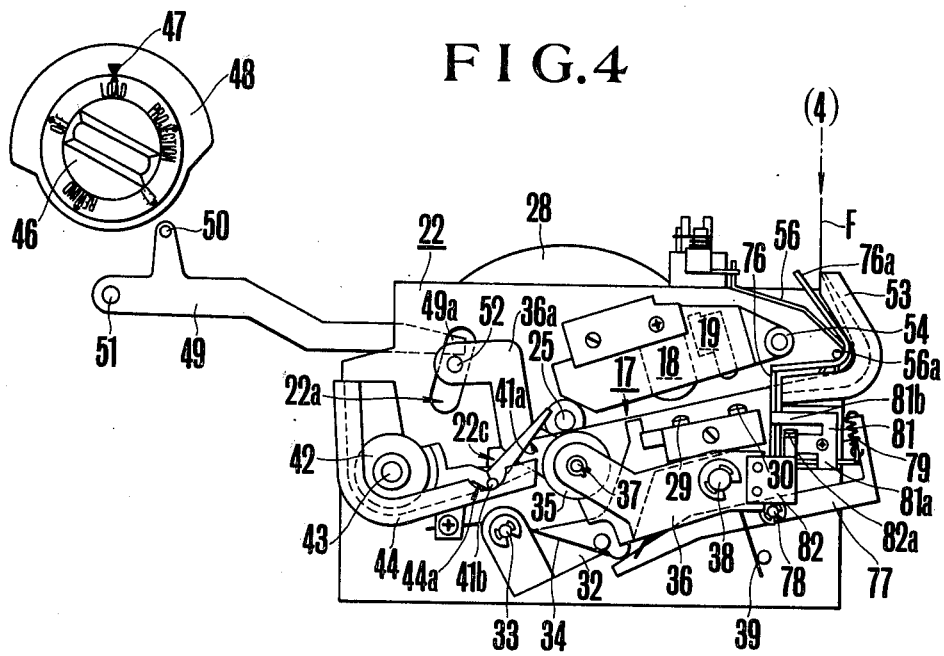

In this state, when the operation dial 46 is changed to the "LOAD" position in order to load the film F, the change-over lever 49 becomes rotatable around the shaft 51 in the counterclockwise direction in FIG. 3A because the cam 48 is released from the cam follower pin 50, so that as is shown in FIG. 4, the pinch roller support frame 36 rotates itself around the shaft 38 in the clockwise direction, rotating the change-over lever 49 in the counterclockwise direction through the pin 52 by the urging force of the spring 39, whereby the pinch roller 35 is set at the operative position at which the roller 35 is in elastic contact with the capstan 25 by the urging force of the spring 39.

Thus, the movable film regulating member 76 is changed to the operative position shown in FIG. 9B by the urging force of the spring 79 against the urging force of the second press piece 81b of the press plate 81 because the pressure upon the rising up part 76c by means of the operation part 82a of the change-over means is released in response to the displacement of the pinch roller support frame 36 in such a manner that the film regulating part 76a enters between the fixed film guide frame 53 and the sensor part 56a of the loop sensor 56. On the other hand, at this time, the pad support lever 32 is, as mentioned above, held by means of the levers 83 and 87 so that the head pads 29 and 30 are set at the inoperative position independently of the displacement of the pinch roller support frame 36.

Further, when the operation dial 46 is changed to the "LOAD" position, the clutch mechanism, not shown, connected with the spindle 3 for the film winding up reel operates in such a manner that the reel spindle 3 is operatively connected with the reel spindle driving pulley 98 (at this time the operative connection of the film supply reel spindle 2 with the reel spindle driving pulley 98 is interrupted because the clutch, not shown, connected to the reel spindle 2 becomes interrupted), and at the same time electrical current is supplied to the motor circuit, not shown, so as to start the motor whereby the pulley 65 is driven through the belt 66, so that the film winding up reel spindle 3 is driven by the reel shaft driving pulley 98 and the intermittent film feed member 7 is driven by the cam mechanism, not shown, connected with the rotation shaft 100 of the pulley 64 and further the fly wheel 28 (and thus the capstan 25) is driven by the fly wheel driving pulley 68.

Now, when the fly wheel 28 is driven, the cam 94 rotates together with the capstan 25, so that the kick lever 91 swings around the shaft 92 under the control of the spring 93, however, the kick lever 91 is so designed that, as is shown in the drawing, the operation part 91a can not reach the engaging part 87a of the second lever 87 even in the phase in which the kick lever 91 swings to the limit of its travel in the clockwise direction in the drawing by means of the maximum lift of the cam 94 when the levers 83 and 87 are in the bent state as is shown in FIGS. 3B and 3C, so that the set state of the pad support lever 32 shown in FIGS. 3A and 4 remains unchanged.

The above state is shown in FIGS. 2 and 4. In this state, when the film F is brought out from the film supply reel R1 and inserted between the aperture plate 5 and film press plate 6 provided at the image projection station 4 through the film guide roller 9 and the film damper 10, the film F is advanced intermittently along the aperture plate 5 by the intermittent film feed member 7 so as to pass through the image projection station 4, whereby as mentioned above, under the cooperation of the film regulating part 76a of the film regulate member 76 set at the operative position with the fixed film guide frame 53, the film F is guided isolated from the sensor part 56a of the loop sensor 56 (FIG. 9B) and introduced into the sound film path 17 for sound recording and reproduction, and caught between the capstan 25 and the pinch roller 35 and further transported by means of the capstan 25 and the pinch roller 35 (FIG. 5).

And when the front end of the film F advanced by the capstan 25 and the pinch roller 35 impinges against the inclined plane 41a of the film detecting member 41, and guided by the inclined plane 41a and further impinges against the top of the key shaped part formed between the inclined plane 41a and the film guide plane 44a of the film guide frame 44 (FIGS. 8B and 8C), the film detecting member 41 is rotated slightly around the shaft 43 in the counterclockwise direction in the drawing by the force of the film F given by the further transportation through the capstan 25 and the pinch roller 35 because at this time the film F is jammed at the top of the key shaped part.

When the film detecting member 41 is rotated sligthly in the counterclockwise direction, the lever 88 united with the film detecting member 41 is also rotated slightly, whereby the second lever 87 is rotated slightly in the counterclockwise direction in FIGS. 3B and 3C around the link connection shaft 90 of the first lever 83. And during the rotation of the second lever 87 when the line connecting the pin 84—the shaft 90—the pin 89 is bent at least into the shape of an angle "∨" at the shaft 90 beyond the straight line, the holding of the pad support lever 32 by the first and the second levers 83 and 87 is released immediately, so that the pad support lever 32 is rotated around the shaft 33 by the urging force of the spring 34 in the clockwise direction in FIG. 5, and thereby the head pads 29 and 30 are changed to the operative position at which the head pads 29 and 30 press the film F against the magnetic heads 18 and 19, respectively (FIG. 5).

Figure 5:
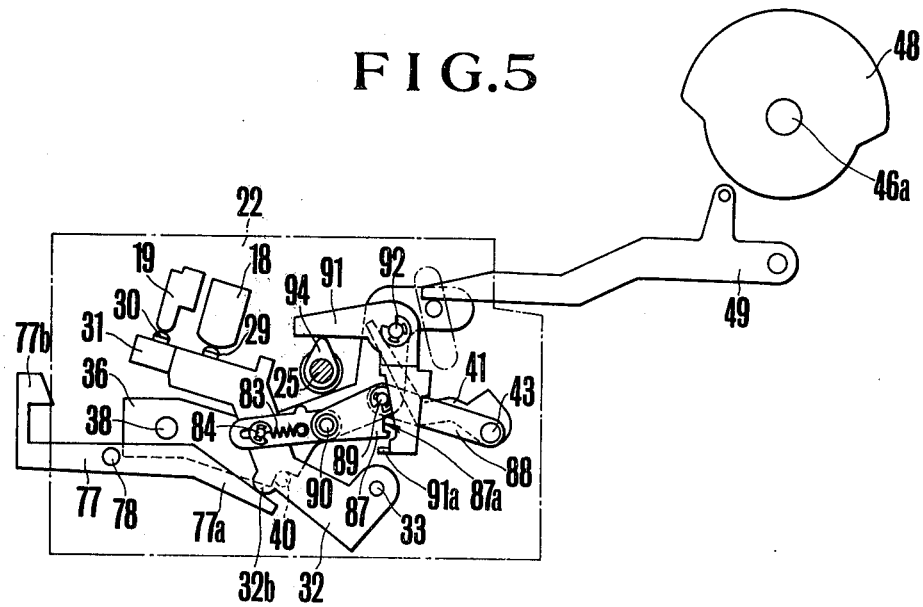
Figure 6:
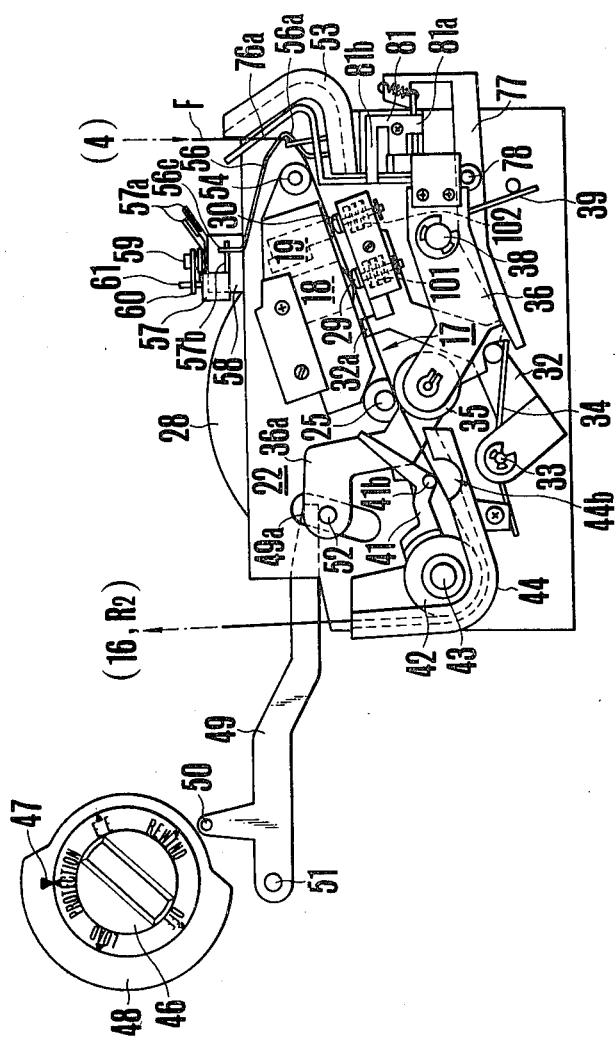
Figure 9C:
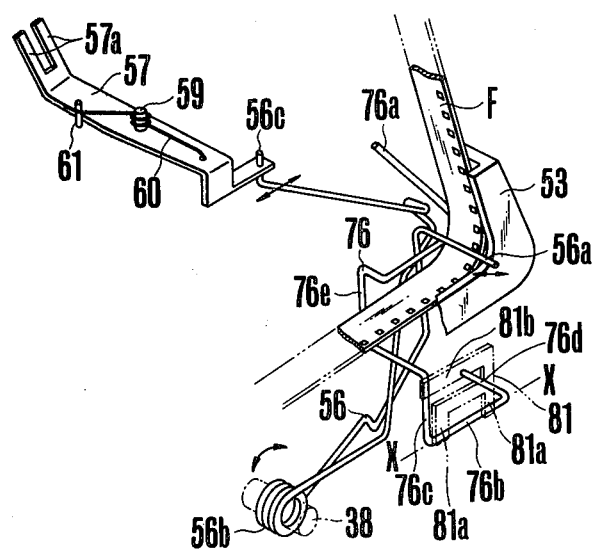

Further, at this time, by the displacement of the pad support lever 32, the lever 77 is rotated around the shaft 78 in the counterclockwise direction in FIG. 5 so that the film regulating member 76 is changed to the inoperative position, whereby the sensor part 56a of the loop sensor 56 can be brought in contact with the film plane at the inside of the film loop formed at the position of the film guide frame 53 (FIG. 9C).

On the other hand, the film F transported by means of the capstan 25 and the pinch roller 35 goes under the film detecting member 41 as is shown in FIG. 6, and is guided by means of the fixed film guide frame 44 and the film duct 96 while the both side edge parts of the film F are in contact with the arched parts 41b of the film detecting member 41 and fed out through the film feed out opening 16, and then caught by the film winding up reel R2 driven by the reel spindle 3 and wound up on the reel R2.

Now, in the state in which the film detecting member 41 rides on the film F (FIG. 8D), the second lever 87 is displaced as is shown in FIG. 5, whereby the engaging part 87a is kept in the withdrawn state out of the movement range of the operation part 91a of the kick lever 91.

Thus, the automatic loading of the film F has been completed.

After the loading of the film F, when the operation dial 46 is changed to "PROJECTION" as is shown in FIG. 6, the lamp circuit, not shown, and the not reproducing circuit, not shown, are closed while the set position of the head pads 29 and 30, the pinch roller 35 and the film regulating member 76 are kept unchanged, so that the projection accompanied by the reproduced sound is started.

Thereafter, during the projection, when the film loop formed between the image projection station 4 and the sound film path 17 (more exactly speaking, between the projection aperture in the aperture plate 5 and the sound recording and reproducing magnetic head 18) is changed and thereby the image projection and the sound reproduction go out of synchronization, the loop sensor 56 is rotated around the shaft 38 in accordance with the change in the film loop and, in consequence, the projection speed control member 57 connected with the output part 56c of the loop sensor 57 changes the contact position of the belt 62 on the conical pulleys 63 and 64 by the forked part 57a thereof in response to the loop sensor 56, whereby the film feed speed by means of the intermittent film feed member 7 is controlled, so that the film loop is maintained at a certain predetermined length and the synchronization of the image projection with the sound reproduction is also maintained.

Now, in this case, as is shown by the curve V in FIG. 10, the displacement of the film F in the above loop is represented with the superposition of the change of the length of the loop over the pulsation of the film F due to the intermittent transportation by means of the above intermittent film feed member 7 (the pulsation frequency is about 1/18 sec. when the projection speed is 18 frames/sec.), so that the displacement of the sensor part 56a of the loop sensor 56 corresponds to the displacement V of the film F, however, hereat, the spring 61 having a strength in balance with the elastic force of the loop sensor 56 works upon the output part 56c of the loop sensor 56 through the control member 57, so that the above pulsation of film F is completely absorbed between the sensor part 56a and the coil part 56b, whereby, from the output part 56c only the displacement exactly corresponding to the change W of the length of the loop as is shown with the curve W' in FIG. 10 is obtained, so that the control of the projection speed by means of the control member 57 is well achieved in accordance with the change W of the length of the loop. As a matter of fact, the relative difference between the curves W and W' at this time can be eliminated by a proper design of the control member 57.

Further in FIG. 10, X shows the state in which the length of the film loop is kept proper, while Y shows the plate in which the length of the film loop is increasing due to for example, the slip between the capstan 25 and the film F and Z shows the state in which the length of the film loop is decreased to a proper amount by the reduction of the projection speed.

In this way, the projection is carried out, in which the image projection is well synchronized with the sound reproduction (FIG. 6).

Hereat, the frame adjustment of the projected image is achieved by moving the intermittent film feed member 7 upwards and downwards by means of the external operation member 8, while the focus adjustment is achieved by advancing and withdrawing the projection lens 14 by means of the external operation dial 15.

Although not shown in the drawing, the film fast forwarding during the projection is made by changing the operation dial 46 from the "PROJECTION" position to the "F.F" position. Namely, when the operation dial 46 is changed to the "F.F" position, the change-over lever 49 is rotated around the shaft 51 in the clockwise direction in FIG. 6 by the cam 48 connected with the operation dial 46, whereby at the end 49a of the lever 49, the pinch roller support frame 36 is rotated around the shaft 38 against the urging force of the spring 39 through the pin 52 in the counterclockwise direction in the drawing, so that the pinch roller 35 is changed to the inoperative position at which the pressure on the film F is released. And by this displacement of the support frame 36, the pad support lever 32 is rotated around the shaft against the urging force of the spring 34 in the clockwise direction through the pin 40, so that the head pads 29 and 30 are changed to the inoperative position at which the pressure on the film F is released.

Further, at this time, although the lever 77 is rotated around the shaft 78 in the counterclockwise direction because the lever 77 is pushed by the projection 32a of the pad support lever 32, at the same time the operation part 82a of the change-over member 82 provided at the tail part of the pinch roller support frame 36 works upon the second press piece 81b of the press plate 81, whereby the film regulating member 76 remains set at the inoperative position.

The above state corresponds to that shown in FIG. 3A.

Now, when the operation dial 46 is changed to the "F.F" position, by means of the change-over mechanism, not shown, connected with the operation dial 46 the film press plate 6 is withdrawn from the aperture plate 5 against the strength of a spring, not shown, so as to form a sufficient space for the running film F therebetween, and also the intermittent film feed member 7 is withdrawn in such a manner that the feed claw 7a is not engaged with the film F.

In consequence, the running path of the film F is restricted by means of the guide rollers 54 and 42 in such a manner that the film F is not brought in contact with the magnetic heads 18, 19, the head pads 29 and 30, the capstan 25 and the pinch roller 35 in a fast forward operation from the supply reel R1 to the winding up reel R2 by the driving force of the reel spindle 3.

Now, even at the time of the film fast forward operation in the same way as is mentioned above, the film detecting member 41 rides on the film plane, so that the first and the second levers 83 and 87 in link connection are bent into the shape of the angle "∨" at the link connection shaft 90, while the engaging part 87a of the second lever 87 is maintained in a position out of the path of the operation part 91a of the kick lever 91. Accordingly, if the operation dial 46 is changed again from the "F.F" position to the "PROJECTION" position, the head pads 29 and 30 and the pinch roller 35 are brought back into the state shown in FIG. 6, so as to be able to continue the projection.

Further, the film rewinding is performed by changing over the operation dial 46 once to the "OFF" position and then to the "REWIND" position. In this case, by means of the clutch change-over mechanism, not shown, connected with the operation dial 46, the clutch mechanism connected with the spindle 2 for the film supply reel R1 is changed from the inoperative state to the operative state while the clutch mechanism connected with the spindle 3 for the film winding up reel R2 is changed from the operative state to the inoperative state, so that the reel spindle 2 is operatively connected with the pulley 98 while the operative connection of the reel spindle 3 with the pulley 98 is interrupted. Otherwise, the set state is same as at the time of the film fast forward operation, and thus the film F is rewound from the winding up reel R2 to the supply reel R1 by the driving force of the reel spindle 2.

Figure 7A:
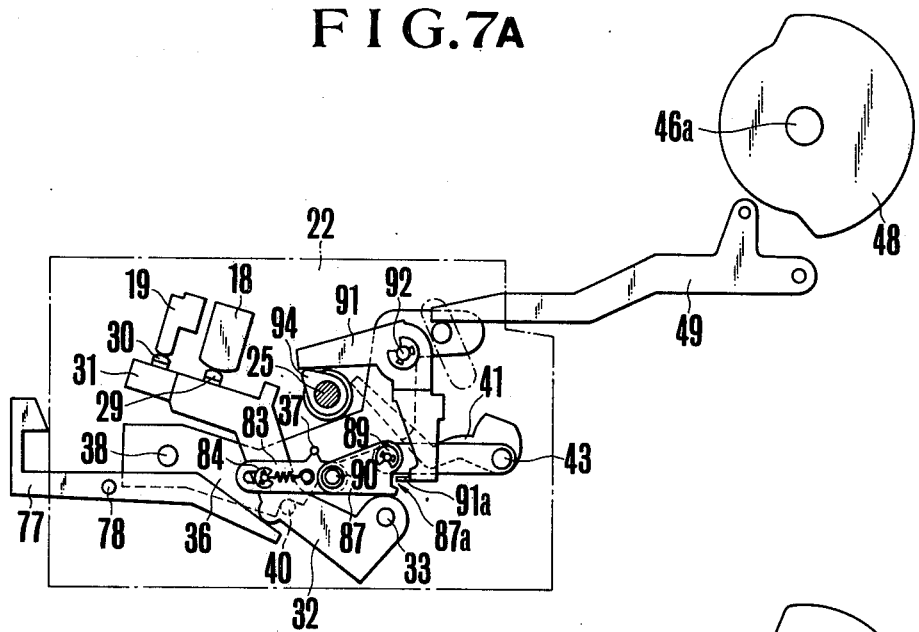
FIGS. 7A and 7B show the state at the termination of projection with the lapse of time.
Figure 7B:
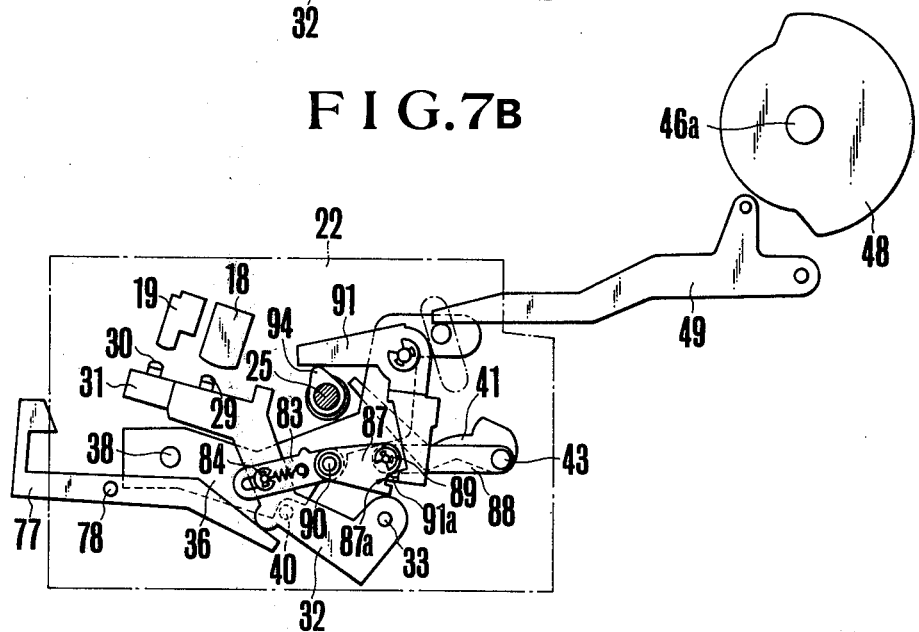

And when the film F does not exist in the sound film path 17 any more after the termination of the film rewinding, the film detecting member 41 enters into the concave part 44a of the film guide frame 44 due to its own weight, so that, as is shown in FIG. 7A, the lever 88 is rotated around the shaft 43 in the counterclockwise direction in the drawing, whereby the second lever 87 is displaced together with the first lever 83 and the engaging part 87a of the second lever 87 is positioned into the movement range of the operation part 91a of the kick lever 91 (FIG. 7A). Thus, in this state, when the operation part 91a of the kick lever 91 swinging around the shaft by means of the cam 94 is rotated in the clockwise direction as is shown in FIG. 7B and impinges against the engaging part 87a of the second lever 87, the second lever 87 is urged to rotate around the pin 89 in the clockwise direction in the drawing because the engaging part 87a is provided at the position lower than the line connecting the shaft 90 with the pin 89, so that the first lever 83 is urged in rotate around the pin 84 to the counterclockwise direction in the drawing, whereby, after all, the both levers 83 and 87 are slightly bent in the shape of the angle "∧" at the link connection shaft 90 as is shown in FIG. 7B, so that the first lever 87 rotates the pad support lever 32 around the shaft 33 in the counterclockwise direction in the drawing against the urging force of the spring 34 through the pin 84. And when the line connecting the pin 84, the shaft 90 and the pin 89 has been bent in the shape of angle "∧" even slightly, the both lever 83 and 87 are bent, as is shown in FIGS. 3B and 3C, until the first lever 83 impinges against the stopper 95 by the urging force of the spring 34 working upon the pad support lever 32, even if the levers 83 and 87 are released from the driving by the operation part 91a of the kick lever 91, so that the pad support lever 32 is completely changed to the position at which the head pads 29 and 30 are distant from the magnetic heads 18 and 19, and thereafter is kept in that position by means of the both levers 83 and 87 unless the film detecting member 41 is displaced.

Now, at this time, by the change-over of the pad support lever 32, the lever 77 is rotated around the shaft 78 in the clockwise direction in FIG. 7B, whereby the film regulating member 76 is again changed to the operative position.

The above state exactly corresponds to that shown in FIGS. 2 and 4.

Now, the above operation is carried out in the same way when the film F does not exist in the sound film path 17 any more at the termination of the ordinary projection.

Thus, after the termination of the film rewinding, when the operation dial 46 is changed to the "OFF" position, the projection apparatus 1 is stopped in the state shown in FIGS. 3A to 3C, so that if the film is newly inserted into the image projection station 4 in the state in which the operation dial 46 has been changed to the "LOAD" position at the next projection, the film can automatically be loaded, and thereby it is possible to carry out the next projection always in the correct state.

Now, even when the projection is interrupted on the way, because the film detecting member 41 has been displaced as long as the film F exists in the sound film path 17, the first and the second levers 83 and 87 constituting the set mechanism for the pad support lever 32 are kept in the bent state in the shape of a reversed angle "∨" although the pad support lever 32 has been changed and thereby the pin 84 has been displaced, and also the engaging part 87a of the second lever 87 is withdrawn out of the path of movement of the operation part 91a of the kick lever 91, so that at the time of starting the next projection, the projection cam immediately be continued smoothly only by changing over the operation dial 46 to the "PROJECTION" position.

Further, if, at the time of the film loading, the pad support lever 32 has not been set at the position at which the head pads 29 and 30 are distant from the magnetic heads 18 and 19, within the initial one rotation of the fly wheel 28 the above set mechanism starts to operate in such a manner that the pad support lever 32 is changed over to the position shown in FIGS. 2 and 4.

As is described above in detail, according to the present invention, the head pad for pressing the film against the magnetic heads for sound recording and reproducing, is automatically changed over to the inoperative position at which the head pad is sufficiently distant from the magnetic head, by means of the set mechanism operated by the cam member operatively connected with the driving motor, and then kept in that position by means of the above set mechanism, while the holding of the head pad by means of the above set mechanism is released by the film detecting member when the detecting member detects the passing of the front end of the film through the magnetic head and the head pad. Thereby the head pad is changed over to the operative position at which the film is pressed against the magnetic head. Thus, the automatic loading of film can always be obtained with certainty, in which it is not necessary to confirm each time prior to starting the projection whether the film is correctly loaded. This differs substantially from the conventional sound motion picture projection device. Further, in spite of a misoperation such that the projection apparatus is changed over into projection mode in the state in which the film is not loaded properly or that the film is loaded in the state in which the apparatus has been changed over into projection mode, the film can automatically be loaded with certainty and thereby the projection can always be carried out in the ordinary state, which is quite profitable for the sound motion picture device.

And, as can also be seen in the embodiment, if the capstan for the continuous film driving and the pinch roller are provided between the magnetic head and the film detecting member, and the film detecting member is provided so as to detect the film fed by the capstan and the pinch roller, the film can be transported for loading by the capstan and the pinch roller while the detectability of the film detecting member is much improved so that all the other film feed means, such as sprockets, of the conventional sound motion picture projection apparatus capable of automatic film loading become unnecessary, whereby the film loading becomes surer, while a remarkably rational sound motion picture projection apparatus capable of automatic film loading can be realized.

Further, as can be seen in the embodiment, if the movable film regulating member which, in cooperation with the fixed film guide, leads the film from the image projection station to the sound recording and reproducing station, isolating the film from the loop sensor, is provided in such a manner that the movable film regulating member is, at the time of film loading, changed over to the operative position at which the movable film regulating member passes between the fixed film guide member and the loop sensor and, in cooperation with the fixed film guide member, leads the film from the image projection station to the sound recording and reproducing station, isolating the film from the loop sensor and, at the termination of the film loading, changed over to the inoperative position at which the movable film regulating member is withdrawn from the space between the loop sensor and the fixed film guide member so as to make the loop sensor operative, there is no danger that at the time of film loading the film is jammed at the loop sensor in spite of the fact that an obstruction, such as a loop sensor, exist in the film path between the image projection station and the sound recording and reproducing station, and whereby a smooth transportation of the film from the image projection station to the sound recording and reproducing station at the time of film loading is always assured, which is quite profitable for realizing the sound motion picture projection apparatus of this kind at a lower price, because the film can easily and automatically be loaded even though the projection apparatus is equipped with the loop sensor.

Further, especially in the above case, if the change-over of the film regulating member is performed in relation to the change-over of the pinch roller and the head pad in such a manner that the film regulating member is changed to the operative position if the pinch roller is pressed against the capstan while the head pad is kept away from the magnetic head, and is automatically changed to the inoperative position when the head pad is pressed against the magnetic head, the sound motion picture projection apparatus is much more complete in that it is an apparatus having a loop sensor, and thus the automatic film loading can be carried out rationally and perfectly.

Further, in case of the loop sensor adopted in the embodiment, the pulsation arising from the intermittent transportation by means of the film advance claw is perfectly absorbed by means of the elasticity of the loop sensor itself and thus the pulsation is never transferred to the output part whereby the displacement of the output part corresponds only to the variation in the length of the film loop in an exact way, so that the sensitivity for the variation in the length of the film loop is much improved. Further, the loop sensor itself is made solely of one piece of elastic wire material in an extremely simple way, and is adjustable in a very simple way and further is realizable at a remarkably low price, which is practically very profitable for the sound motion picture projection apparatus.

What is claimed is:

1. A sound motion picture projection apparatus comprising:
   (a) means for magnetically recording and reproducing sound, said means being disposed along a sound recording and reproduction film path;
   (b) pressure means for pressing a film against said magnetic means for sound recording and/or reproduction, said pressure means being shiftable between a first position to press the film against the magnetic means and a second position to release the pressing of the film against the magnetic means;
   (c) urging means for urging said pressure means toward said first position thereof;
   (d) continuous film advancing means disposed along said sound film path for continuously advancing the film after passing said magnetic means;
   (e) a driving motor for driving said film advancing means;
   (f) a setting mechanism for setting and retaining said pressure means in said second position against the urging force of said urging means, said setting mechanism being arranged to be driven by said driving motor and to set the pressure means to the second position by the driving force of the driving motor; and
   (g) film detecting means for detecting the film advanced by said film advancing means, said detecting means being operatively connected with a portion of said setting mechanism and arranged to release the retaining of said pressure means in said second position by means of the setting mechanism upon detection of the oncoming film advanced by the film advancing means.

2. A sound motion picture projection apparatus according to claim 1, wherein said setting mechanism comprises:
   first and second lever members linked with each other, said first lever member being operatively connected with the pressure means and said second lever member being operatively connected with the film detecting means;
   an actuating member means for actuating the second lever member so as to set the pressure means to the second position; and
   a cam member means for driving the actuating member means, said cam member means being operatively connected with the driving motor;
   the actuating member means further comprising means for actuating the second lever member in response to being driven by the cam member means; the second lever member comprising means operable in response to being actuated by the actuating member means for setting the pressure means to the second position by cooperation with the first lever member and for thereafter retaining the pressure means at the second position; while the detecting means further comprises means operable in response to detecting the film for shifting the second lever member so as to release the retaining of the pressure means at the second position by the cooperation of the first and the second lever members.

3. A sound motion picture projection apparatus according to claim 1, wherein said continuous film advancing means includes:
   a driving member disposed at a fixed position along said sound film path and operatively connected with said driving motor; and
   a pressure roller member means for pressing the film against said driving member and for continuously advancing the film, said roller member being changeable between a first position to press the film against the driving member and a second position to release the pressing of the film against the driving member through the operation of a manually operable means; and
wherein said cam member means is fixedly connected with said driving shaft member.

4. A sound motion picture projection apparatus according to claim 3, wherein said film detecting means is disposed in said sound film path behind said driving member and shiftable in response to the film advanced by the cooperation of said driving member and said pressure roller member.

5. A sound motion picture projection apparatus according to claim 1, further comprising:
intermittent film advancing means for intermittently advancing the film at a picture projection station for picture projection;
film guide means for guiding the film advanced by said intermittent film advancing means toward said sound film path, said film guide means being fixedly arranged between the projecting station and the sound film path;
loop sensing means for detecting the change in the length of a film loop formed between said picture projection station and said sound film path; and
a movable film regulating means, said regulating means being changeable between a first position at which the regulating means enters between the film guide means and the loop sensing means for guiding the film fed from the projection station to the sound film path, while isolating the film from the loop sensing means and a second position at which the regulating means is withdrawn from the space between the film guide means and the loop sensing means, and operatively associated with said pressure means for maintaining the film control means in the first position when the pressure pad means is in its second position and for shifting the film control means to the second position when the pressure pad means is shifted to its first position.

6. A sound motion picture projection apparatus according to claim 5, wherein said loop sensing means has a sensor part bent so as to contact with the film plane, a coil part connected with the sensor part and adapted as link part for swinging the whole system and an output part for mechanically providing the information of the variation in the length of the film loop, and is made of an elastic wire material having a small weight; and wherein the film regulating means, at the first position, is inserted between the sensor part and the film guide means while at the second position, is withdrawn out from the space between the sensor part and the film guide means.

7. A sound motion picture projection apparatus comprising:
(a) a magnetic head means for recording sound signals on a film or for reproducing sound signals recorded thereon, said head means being fixedly disposed at a position along a sound recording and/or reproduction film path;
(b) pressure pad means for pressing the film against said magnetic head means for sound recording and/or reproduction;
(c) first supporting means for supporting said pressure pad means, said first supporting means being shiftable between a first position in which the pressure pad means presses the film against the magnetic head means and a second position in which the pressure pad means releases the pressing of the film against the magnetic head means;
(d) urging means for urging said first supporting means toward its first position;
(e) film driving means disposed at a fixed position along said sound film path for continuously advancing the film after it passes said magnetic head means;
(f) pressure roller means for pressing the film against said film driving means for continuously advancing the film;
(g) second supporting means for rotatably supporting said pressure roller means, said second supporting means being shiftable between a first position in which the pressure roller means presses the film against the film driving means and a second position in which the pressure roller means releases the pressing of the film against the film driving means;
(h) manually operable means for shifting said second supporting means between its first and second positions;
(i) motor means for driving said film driving means;
(j) a setting mechanism means for setting and retaining said first supporting means in its second position against the urging force of said urging means, said setting mechanism means being arranged to be driven by said motor means for setting the first supporting means to its second position by the driving force of the motor means; and
(k) film detecting means for detecting the film advanced by the cooperation of said film driving means and said pressure roller means in a state where said second supporting means is shifted to its first position, said film detecting means being operatively connected with a portion of said setting mechanism, the film detecting means comprises means for shifting said first supporting means to its second position by means of said setting mechanism when it detects the film advanced by the cooperation of said film driving means and said pressure roller means; said first supporting means being automatically shifted to its first position by the urging force of said urging means when the first supporting means is shifted to its second position by said setting mechanism.

8. A sound motion picture projection apparatus according to claim 7, wherein said setting mechanism comprises:
first and second lever members linked with each other, said first lever member being operatively connected with the first supporting means while said second lever member is operatively connected with the film detecting means;
an actuating member means for actuating the second lever so as to set the first supporting means to the second position;
a cam member means for driving the actuating member, said cam member being connected with the film driving motor;
the actuating member comprising means for actuating the second lever member in response to being driven by the cam member means; the second lever member comprising means for setting the first supporting means to the second position by cooperation with the first lever member and for thereafter retaining the first supporting means at the second position; while the detecting means comprises means operable in response to detecting the film for shifting the second lever member so as to release the retaining of the first supporting means at the second position by cooperation of the first and the second lever members.

9. A sound motion picture projection apparatus comprising:
   (a) intermittent film advancing means for intermittently advancing a film at a picture projection station;
   (b) continuous film advancing means for continuously advancing the film at a sound recording and reproduction station;
   (c) film guide means for guiding the film advanced by said intermittent film advancing means to the sound recording and reproduction film path, said film guide means being fixedly provided between the picture projection station and the sound recording and reproduction station;
   (d) loop sensing means for detecting the change in the length of a film loop formed between the picture projection station and the sound recording and reproduction station; and
   (e) movable film regulating means, said regulating means being arranged in the neighborhood of the film guide means and changeable between a first position at which the regulating means is inserted between the film guide means and the loop sensing means for guiding the film fed from the picture projection station toward the sound recording and reproduction station by cooperation with the film guide members while isolating the film from the loop sensing means, and a second position at which the regulating means is withdrawn from the space between the film guide means and the loop sensing means.

10. A sound motion picture projection apparatus according to claim 9, further comprising:
    (a) magnetic means for magnetically recording and reproducing sound, said means being disposed at a sound recording and reproduction station; and
    (b) pressure means for pressing the film against said magnetic means for sound recording and/or reproduction, said pressure means being shiftable between a first position for pressing the film against the magnetic means and a second position to release the pressing of the film against the magnetic means;
    wherein said film regulating means is operatively associated with said pressure means in such a manner that the film regulating means is kept in its first position when the pressure means is in its second position and is shifted to the second position when the pressure means is shifted to its first position.

11. A sound motion picture projection apparatus according to claim 10, wherein said loop sensing means has a sensor part bent so as to contact with the film plane, a coil part means connected with the sensor part and adapted as link part for permitting the loop sensing swing means to swing and an output part for mechanically providing the information of the variation in the amount of the film loop, and is made of an elastic wire material having a small weight; and wherein the film regulating means, at the first position, is entered between the sensor part and the film guide means while at the second position, is retired out from the space between the sensor part and the film guide means.

12. A sound motion picture projection apparatus comprising:
    (a) intermittent film advancing means for intermittently advancing a film at a picture projection station;
    (b) continuous film advancing means for continuously advancing the film at a sound recording and reproduction station;
    (c) loop sensing means for detecting the change in the length of a film loop formed between the picture projection station and the sound recording and reproduction station; said loop sensing means having a sensor part bent so as to contact with the film plane, a coil part connected with the sensor part and adapted as link part for permitting the loop sensing means to swing and an output part means extending from the coil part for mechanically providing the information of the variation in the film loop length, and being made of an elastic wire material having a small weight and being so arranged that the sensor part is positioned in the film path from the picture projection station to the sound recording and reproduction station; and
    (d) speed control means for controlling the film advancing speed of the intermittent film advancing means in accordance with the mechanical output from the loop sensing means.

* * * * *